United States Patent
Skinner

[15] 3,684,916
[45] Aug. 15, 1972

[54] HEADLAMP TURN OFF TIME DELAY

[72] Inventor: Kenneth R. Skinner, Bloomington, Ill.

[73] Assignee: General Motors Corporation, Detroit, Mich.

[22] Filed: Jan. 12, 1970

[21] Appl. No.: 2,309

[52] U.S. Cl. .................................... 356/82, 356/83
[51] Int. Cl. ............................................. B60q 1/08
[58] Field of Search ..................... 315/82, 83, 77, 79

[56] References Cited

UNITED STATES PATENTS

| | | | |
|---|---|---|---|
| 3,514,665 | 5/1970 | Chaustowich | 315/82 |
| 3,388,288 | 6/1968 | Kibler | 315/82 X |
| 3,530,333 | 9/1970 | Roberts | 315/83 |
| 3,244,899 | 4/1966 | Merle | 315/82 X |
| 3,374,394 | 3/1968 | Miller | 315/82 |
| 3,476,975 | 11/1969 | Brock | 315/83 |
| 3,544,838 | 12/1970 | Carruth et al | 315/82 X |

*Primary Examiner*—Ronald L. Wibert
*Assistant Examiner*—F. L. Evans
*Attorney*—F. J. Soucek and C. R. Engle

[57] ABSTRACT

A time delay system for turning off vehicle headlamps when the vehicle ignition switch is off and the headlight switch is moved from the "on" position to the "off" position including a holding relay and a thermistor in circuit to delay the turning off of the lamps for a period of from 30 to 40 seconds.

1 Claim, 1 Drawing Figure

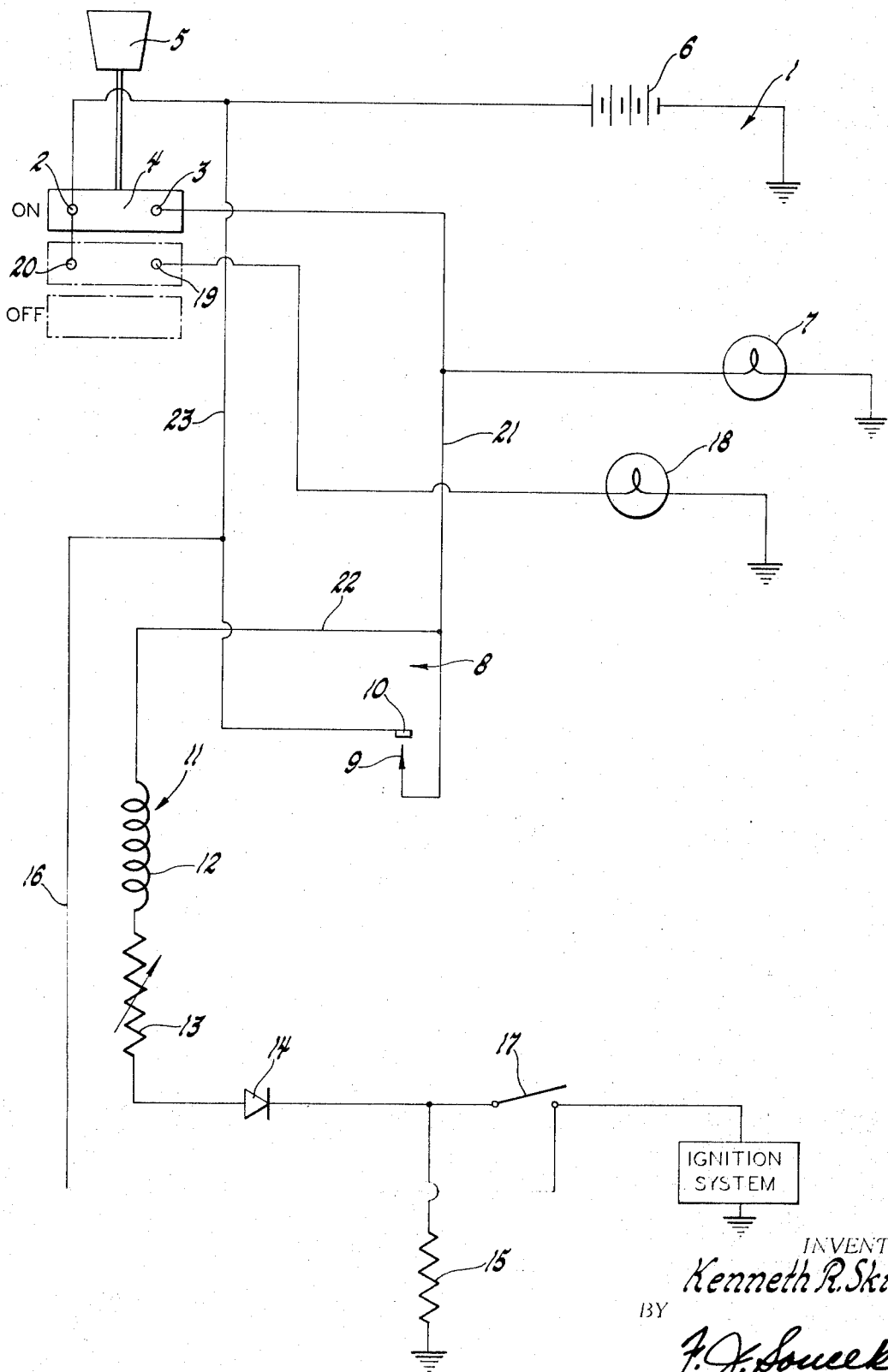

HEADLAMP TURN OFF TIME DELAY

The present invention relates generally to a headlight control system and more particularly to a system for delaying the time within which headlamps of a vehicle will be deenergized after the headlight switch is moved from the "on" position to the "off" position.

Motor vehicles are normally parked for the night in darkened areas. If they are parked outside or in garages, it is generally inconvenient to turn off the vehicle lights and then find it necessary to locate a light switch in the garage in order to park the vehicle within the garage.

It is, therefore, an object of the present invention to provide means for automatically turning off the headlights of a vehicle, a predetermined time after they have been manually turned off.

It is a further object of the present invention to provide means for delaying the deenergization of the headlights only when the vehicle ignition switch is closed.

It is still another object of the present invention to vary the time that the headlamps will remain energized after the headlight switch has been moved from an "on" position to an "off" position.

The above and other objects will become more apparent as the specification is read in connection with the accompanying drawing.

Referring to the drawing, a first circuit 1 includes a pair of contacts 2 and 3 adapted to be bridged by a sliding contact 4 of a headlamp switch 5. As shown in the drawing, the switch 5 is in the "on" position. The circuit 1 further includes a source of power 6, which is preferably the vehicle battery, and the vehicle headlamps indicated at 7. It is seen that the contacts 2 and 3 and the battery and headlamps are serially connected so that the headlamps are on when the switch 5 is in the "on" position.

A second circuit 8 is connected in parallel with circuit 1 and includes the battery 6, headlamps 7, a fixed contact 9 and a movable contact 10.

A third circuit 11, adapted to control circuit 8 includes a relay coil 12, a temperature responsive resistance element 13, a rectifier 14 and the inherent resistance 15 of the vehicle ignition system. The third circuit 11 is electrically bypassed by a conductor 16 and ignition switch 17 when the ignition switch is closed.

While not a part of the time delay system, the drawing shows an additional circuit for the vehicle parking lamps including the switch 5, battery 6, parking lamps 18 and contacts 19 and 20.

In operation, with headlight switch 5 in the "on" position current is applied from battery 6 through contacts 2 and 3 to headlamps 7 and the headlamps remain on. Also current is applied to circuit 11 from battery 6, contacts 2, 3, conductors 21 and 22 through the relay coil 12, temperature responsive resistor 13, rectifier 14 and resistance 15 to ground.

Current through relay coil 12 causes the movable contact 10 to engage the fixed contact 9 and complete circuit 8. When switch 5 is moved from the "on" position to the "off" position with the ignition switch 17 open the headlamps remain lit through circuit 8. This includes the battery 6, conductor 23, the movable contact 10, the fixed contact 9, conductor 21 to headlamps 7.

At the same time, circuit 8 provides a holding circuit for relay coil 12. This circuit is completed from the battery 6, conductor 23, contacts 9 and 10, conductor 22 to relay coil 12 and temperature responsive resistor 13. The resistor 13 has a cold resistance of approximately 16 ohms and has a positive temperature coefficient (resistance increases with temperature). Current flowing through resistor 13 is sufficient to cause the resistance of resistor 13 to increase. After approximately 30 to 40 seconds the resistance is great enough to limit the current through the coil 12 to a point that will permit movable contact 10 to move away from contact 9 and open circuit 8 thereby deenergizing the headlamps.

It is noted that with the ignition switch closed the time delay circuit including elements 12 and 13 is shorted or bypassed by the conductor 16 and the ignition switch 17.

The purpose of the diode 14 is to prevent feedback when the ignition switch is on and the headlamp switch is off. If the diode 14 were not used the relay 12 would oscillate as follows:

With the ignition switch closed, battery voltage would be applied to the series circuit of the temperature responsive resistor and the relay coil. The lamp load 7 would present a low enough resistance to allow the relay to pull on thus closing contacts 9 and 10 to apply battery voltage to conductor 22. Battery voltage now exists on both sides of coil 12 and the coil would be deenergized opening contacts 9 and 10. At this point the relay coil would again be grounded through the ignition switch and be reenergized. Thus the need for the diode 14.

As stated above resistor 15 represents the resistance that exists on the cold side of the ignition switch that is present in all vehicles. This resistance is approximately 10–20 ohms.

It is seen that there has been provided a time delay circuit to prevent the headlamps of a motor vehicle from being extinguished for a period of approximately 30–40 seconds after the headlight switch is moved from the "on" position to the "off" position. This permits the driver to lock his car or open and light his garage or take some other action that requires light for a short period of time. With this system, and with the ignition switch "on," the driver has complete control of his headlights and may for example extinguish the lights immediately when entering tunnels or other areas where lights are not permitted.

Various changes and modifications may be made to the subject system as will be readily apparent to those skilled in the art without departing from the scope and teaching of this invention as defined by the following claims.

What is claimed is:

1. A time delay system for turning off the headlamps of a motor vehicle including a first circuit comprising a first and second contact, a source of voltage and said vehicle headlamps, a switch electrically bridging said contacts to complete said circuit and turn on said headlamps, a second circuit comprising in series said contacts, said source of voltage, a relay including a fixed contact and a movable contact, a temperature responsive resistance element, a rectifier, and the ignition switch of said vehicle, and a third circuit comprising in series said source of voltage, said headlamps and said fixed and movable contacts.

* * * * *